United States Patent [19]

Fehr

[11] Patent Number: 5,070,769

[45] Date of Patent: Dec. 10, 1991

[54] PNEUMATIC LINEAR VIBRATOR

[76] Inventor: Max Fehr, Prazisionsmechanik, Berg am Irchel CH-8415, Switzerland

[21] Appl. No.: 360,907

[22] PCT Filed: Aug. 23, 1988

[86] PCT No.: PCT/CH88/00143

§ 371 Date: Jun. 30, 1989

§ 102(e) Date: Jun. 30, 1989

[87] PCT Pub. No.: WO89/02514

PCT Pub. Date: Mar. 23, 1989

[30] Foreign Application Priority Data

Sep. 9, 1987 [CH] Switzerland ........................ 3492/87

[51] Int. Cl.⁵ ................................................ F16J 15/18

[52] U.S. Cl. .................................. 92/166; 92/165 R; 91/232; 91/233; 91/235

[58] Field of Search ................. 92/111, 150, 151, 166, 92/165 R; 91/232, 233, 234, 325; 173/135; 366/108

[56] References Cited

U.S. PATENT DOCUMENTS

| | | | |
|---|---|---|---|
| 2,748,750 | 6/1956 | Altschuler | 91/234 |
| 2,887,989 | 5/1959 | Dulaney | 91/234 |
| 2,917,025 | 12/1959 | Dulaney | 173/35 |
| 3,045,768 | 7/1962 | Huffman | 91/325 |
| 3,736,843 | 6/1973 | Leibundgut | 91/234 |
| 4,194,435 | 3/1980 | Gaun et al. | 91/234 |
| 4,303,002 | 12/1981 | Maslakov et al. | 91/325 |
| 4,351,225 | 9/1982 | Brandenberg et al. | 91/325 |

FOREIGN PATENT DOCUMENTS

| | | | |
|---|---|---|---|
| 760428 | 8/1934 | France | 91/232 |
| 709893 | 6/1954 | United Kingdom | 91/234 |

*Primary Examiner*—Edward K. Look
*Assistant Examiner*—Thomas Denion
*Attorney, Agent, or Firm*—Bachman & LaPointe

[57] ABSTRACT

A pneumatic linear vibrator comprises a piston guide sealed on one side and delimited by detachable end parts (14,16), a pinton (10), a sound-absorbing pipe (52) which forms the housing, and means for supplying and removing a gaseous or vaporized pressure medium. Relative motion between the guide with the end parts and the piston is ensured by automatic alternating delivery of the pressure medium to a working volume (V,V1,V2) located on one face of the piston. The piston (10) has a longitudinal axial bore (22) with a snap ring groove (26) in the region of the ends of the longitudinal median plane of the piston. The snap ring grooves are connected to a face of the piston (10) by at least two axisymmetric channels (27) which run in the axial direction (A) and are sealed off from the longitudinal axial bore (22) of the piston (10). A guide pipe (18) for delivery of the pressure medium, which is closed at one end, penetrates the end parts (14,16) and the longitudinal axial bore (22) of the piston (10) in a sealed manner. The guide pipe (18) serves as a piston guide and has radially disposed axisymmetric output openings (32) for the pressure medium corresponding to the snap ring grooves (26) in the longitudinal axial bore (22) of the piston (10). The vibrator has a slim, elongated shape and can be used for example for sieves, conveying channels compacting installations and for driving tools.

10 Claims, 4 Drawing Sheets

PNEUMATIC LINEAR VIBRATOR

BACKGROUND OF THE INVENTION

The present invention relates to a pneumatic linear vibrator, comprising a piston guide sealed at least on one side and delimited by detachable end parts, a piston, a sound-absorbing pipe, and means for supplying and removing a gaseous or vaporized pressure medium, the relative motion between the guide with the end parts and the piston being effected by automatic alternating supply of the pressure medium to a working volume formed on one face of the piston.

A congeneric compressed-air vibrator with a reciprocatingly movable piston is known from German Offenlegungsschrift 3,031,049. This compressed-air vibrator has a housing which is made of a piece of light-metal section and has four ribs arranged in a cross shape. Arranged in two ribs are the compressed-air supply and compressed-air discharge; the two other ribs serve to accommodate fixing elements. This vibrator has proved successful in practice, but has the disadvantage that it is of relatively complicated construction and is therefor correspondingly expensive.

The object of the inventors is to create a linear vibrator having relative piston motion and consequently controlled, alternating supply of the pressure medium, which linear vibrator is simple to manufacture, requires little maintenance and can be used universally.

SUMMARY OF THE INVENTION

This object is achieved according to the invention by a piston having a longitudinal axial bore which has an annular groove in the region of each of the ends or close to either side of the longitudinal median plane of the piston, which annular grooves are each connected to a face of the piston by at least two axisymmetric channels which run in the axial direction and are sealed off from the longitudinal axial bore of the piston, this face being the adjacent face when annular grooves are arranged in the region of the piston ends and the remote face when annular grooves are arranged in the region of the longitudinal median plane of the piston, and a guide pipe for the supply of the pressure medium, which guide pipe is closed on one side, penetrates through the end parts and the longitudinal axial bore of the piston in a sealing manner, serves as a piston guide and has radially disposed axisymmetric outlet openings for the pressure medium which correspond to the annular grooves in the longitudinal axial bore of the piston.

The impressively simple construction of the linear vibrator according to the invention permits a slim, elongated shape which reveals its advantages in particular when the vibrator is used, for example, for sieves, conveying channels, compacting installations or for driving tools. Air is conveniently used as the pressure medium, but exhaust gases or steam, for example, can also be used.

The external dimensions of the linear vibrator can be varied as desired depending on the intended use. The piston can have, for example, a length of 10–20 cm and a diameter of 1.5-5 cm, in which case the longitudinal axial bore can have a lumen of 25–50% of the outside diameter of the piston. The annular grooves, conveniently 1-3 mm deep, can, for example, be at a distance of 1-3 cm from the faces of the piston or from its longitudinal median plane.

As usual in pneumatic vibrators, the stroke of the piston is only a few centimeters. The frequency of the piston, moving in a reciprocating manner, is primarily dependent on the pressure of the supplied medium, the stroke and the weight of the piston, and also the coefficient of friction of the sliding surfaces.

The linear vibrator is conveniently fed directly from the compressed-air network, which normally has a pressure of 6–8 bar.

The frequency of the pneumatic linear vibrator having a piston movable in a reciprocating manner can be increased by material being removed axisymmetrically from the piston, but the control of the alternating compressed-air supply to the working volumes must not be disturbed.

The drive of the pneumatic linear vibrator by means of an alternating supply of the pressure medium is preferably effected via at least one working volume which is formed by a cylindrical recess in the relevant end part, the guide pipe serving as supply pipe for the pressure medium, and a face of the piston, which, with its inner and outer surface, is seated in a sealing manner. During the forward motion, the working volume, starting from normal pressure, is compressed until the annular groove in the piston reaches the corresponding outlet openings in the guide pipe. The pressure medium flowing out at high pressure initiates the backward motion, which is continued until, on the one hand, the piston has come out of the cylindrical recess in the end part and the pressure medium can escape and, on the other hand, pressure medium can flow in again on the opposite side of the piston.

The pneumatic linear vibrator can be manufactured in two basic types:

The guide pipe and/or an end part can be fixed to a bearing surface by known mechanical means or can be inserted as a plunging vibrator into a mass to be compacted. In this case, the piston is moved in a reciprocating manner during operation.

The piston is equipped with known means for mechanical fixing, longitudinal slots corresponding to the linear motion being cut out of the sound-absorbing pipe. In this case, which is less common in practice, the guide pipe having the end parts is moved in a reciprocating manner during operation.

Pneumatic linear vibrators working horizontally or virtually horizontally are advantageously equipped with a starting aid. With a spring or by means of a portion of the pressure medium, the piston can change its position relative to the guide pipe in such a way that an annular groove in the piston and outlet openings in the guide pipe lie one over the other and the vibration process is triggered.

In a specific embodiment, the vibrator, instead of working with two working volumes arranged at the faces of the piston, can work on one side with a return spring. The spring, compressed on the other face of the piston after the pressure medium is introduced, pushes the piston back again, after the expulsion of the pressure medium from the working volume, until outflowing pressure medium triggers the next working cycle.

The sound-absorbing pipe, preferably arranged coaxially at a distance from the piston, collects the expelled pressure medium and advantageously conducts it away laterally. A cooling labyrinth known per se can be arranged in the sound absorber. The sound-absorbing pipe of the linear vibrator is also its protective housing.

Aluminum and brass, which can be readily worked mechanically, are preferably used at least for the piston and the guide pipe. The sound-absorbing pipe, on the other hand, can be made not only from one of these materials but also from another suitable material, e.g. plastic or ceramic. In special cases, however, steel can also be used at least partly instead of the materials mentioned.

The sliding surfaces are in practice preferably coated with a known friction-reducing, wear-resistant inorganic or organic material.

The axisymmetric construction of the components of the linear vibrator which move in a reciprocating manner is of particular importance for a good vibratory motion which is free of wear as far as possible.

If the pneumatic linear vibrator is to be plunged into a mass to be compacted, the faces of the sound-absorbing pipe are sealed off, connecting pieces being provided for the supply of the pressure medium and usually also for removing the pressure medium. In the case of aggressive masses, the sound-absorbing pipe can be provided with a known corrosion-resistant and/or erosion-resistant covering if it is not made of an appropriate material.

If the pneumatic linear vibrator according to the invention is to be used as a hammer, the piston must strike the end part on the side remote from the compressed air supply. In this case, the inner and outer face of the end part acted upon by the piston must be made of a known wear-resistant and impact-resistant material, as must also the corresponding face of the piston.

So that the striking motion of the piston is not excessively decelerated, discharge bores are preferably arranged in the outer wall of the relevant sealing end part directly next to the striking surface. If no other known mechanical or pneumatic means are provided for the return of the piston and if all the air escapes on the striking side, the piston is returned by a starting aid.

In the linear vibrator working as a hammer, the outer side of the end cylinder, depending on the type of application, is either of flat design or is designed as a cutting or single-point tool. Use as a riveting hammer has proved to be especially advantageous.

BRIEF DESCRIPTION OF THE DRAWINGS

The invention is described in greater detail with reference to the exemplary embodiments shown in the drawing, in which, schematically.

DETAILED DESCRIPTION

Figure 1:
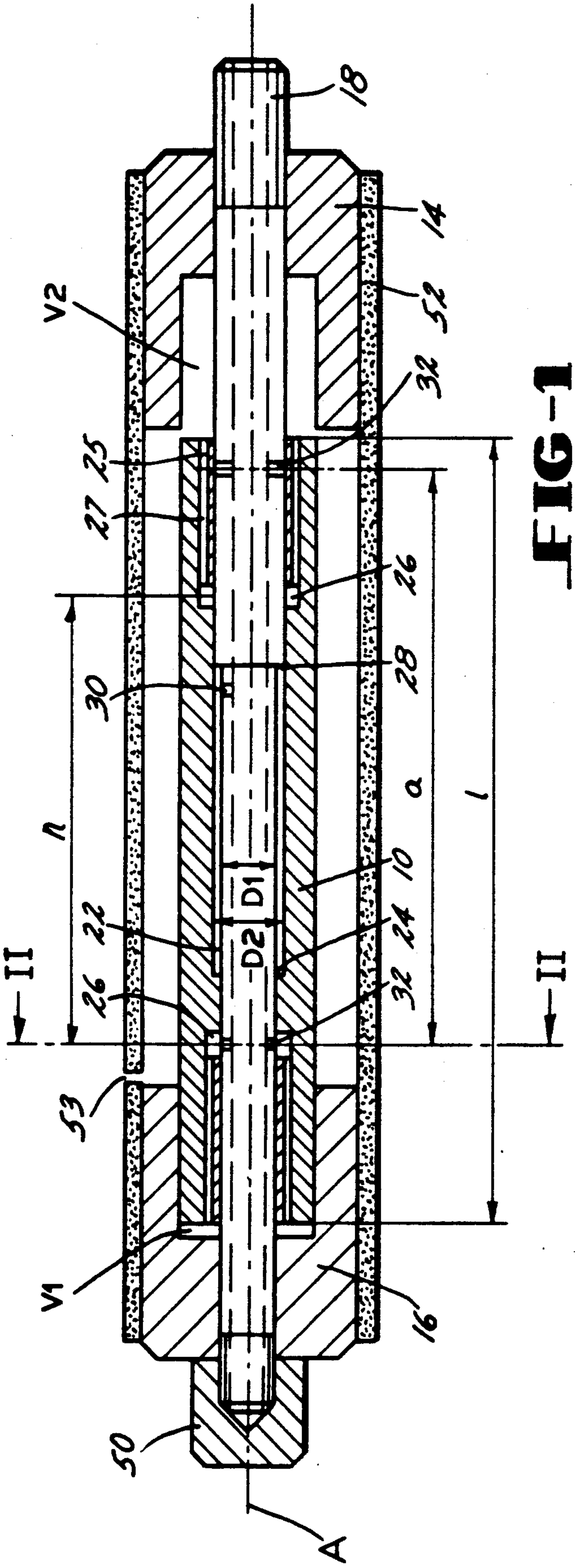
FIG. 1 shows a longitudinal section through a linear vibrator having two identical end parts of cylindrical design and a pneumatic starting aid.

The compressed-air linear vibrator shown in FIG. 1 essentially consists of a piston 10, end parts 14, 16 of cylindrical design, a guide pipe 18, also serving to supply the pressure medium, in particular compressed air, and a sound-absorbing pipe 52. In principle, the guide pipe 18 can be connected to the compressed air on both sides. In practical use, however, one side is advantageously closed.

In the direction of the compressed-air supply, the longitudinal axial bore 22 of the piston 10 has a cross-section reduction 24, the diameter $D_1$ being reduced in one step to $D_2$. Both the larger and the smaller bore have, in the region of the faces of the piston 10, one annular groove 26 each, from each of which—as shown in section in FIG. 2—four channels 27 lead parallel to the longitudinal axis A of the piston 10 to its adjacent face, these channels being cut longitudinally out of the shell of an inserted sleeve 25 and thus being closed from the longitudinal axial bore 22. The length of the piston is designated by 1, and the distance between the annular grooves is designated by n.

The longitudinal axial bore 22 of the piston 10, slides, with the formation of an air cushion, on the guide pipe 18, which in turn has a narrowed section 28 in the outside diameter from $D_1$ to $D_2$ which corresponds to the cross-section reduction 24. Directly next to this narrowed section, one or two axisymmetric auxiliary bores 30 having a cross-section of about 1 $mm^2$ penetrate through the narrowed guide pipe 18, as indicated in FIG. 1.

At a distance a from one another, three axisymmetric outlet openings 32 each pass through the wall of the guide pipe 18. The openings each have a lumen of 3–4 $mm^2$.

The guide pipe 18 protruding from the end part 14, which is arranged on the inlet side for the compressed-air, serves as a fixing connection for a compressed-air supply hose (not shown). The latter is conveniently secured with a hose clamp or the like. The end part 16 has a closure cap 50 for the guide pipe 18. In the present case, the cap is equipped in such a way that it serves at the same time to fix the compressed-air linear vibrator to a device to be vibrated. For this purpose, it can have an external thread (not shown).

The working volumes $V_1$ and $V_2$ are formed by pot-shaped recesses in the end parts 14, 16, the guide pipe 18 and the relevant faces of the piston 10.

Figure 2:
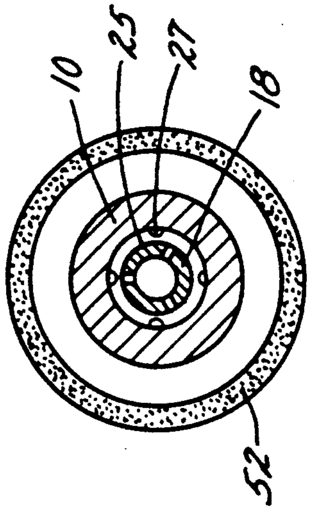
FIG. 2 shows a cross-section along line II—II.

When the medium, for example compressed air having a line pressure of 6–8 bar, is being supplied to the linear vibrator shown in FIGS. 1 and 2, air first of all passes through the auxiliary bore/bores 30 into the hollow space formed by the longitudinal axial bore 22 in the piston 10 having the larger diameter $D_2$ and the narrowed outside diameter $D_1$ of the guide pipe 18 as well as the steps at 24 and 28. The piston 10 is displaced in the direction of the end part 16 until the annular groove 26 having the smaller diameter reaches the outlet openings 32 of the narrowed guide pipe 18. This position is shown in FIG. 1.

As soon as the compressed air can penetrate through the outlet openings 32 via the channels 27 into the working volume $V_1$, the piston is thrust in the other direction, the working volume $V_2$ located at the end part 14 being reduced and the air being compressed. When the larger annular groove 26 reaches the outlet openings 32 of the non-narrowed section of the guide pipe 18, the direction of motion of the piston 10 is reversed again by the compressed air penetrating via the channels 27 into the working volume $V_2$. In this position, compressed air is expelled from the working volume $V_1$ through an annular clearance (R) into the annular intermediate space between the piston 10 and the sound-absorbing pipe 52 and exhaust through exhaust means.

The faces of the piston 10 do not strike the inner faces of the end parts 14, 16, since, after the compensation of pressure, the compressed residual air forms a pressure cushion.

Figure 3:
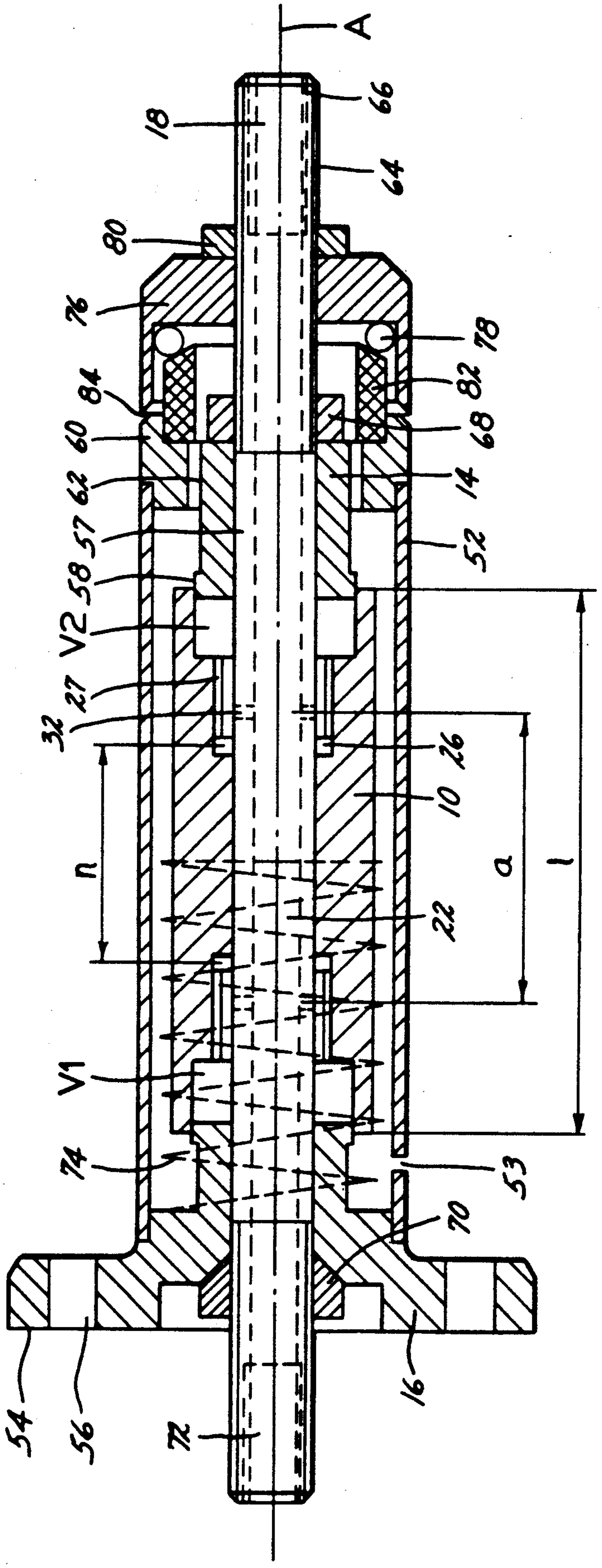
FIG. 3 shows a longitudinal section through a linear vibrator having a fixing flange and a coil spring as a starting aid.
Figure 4:
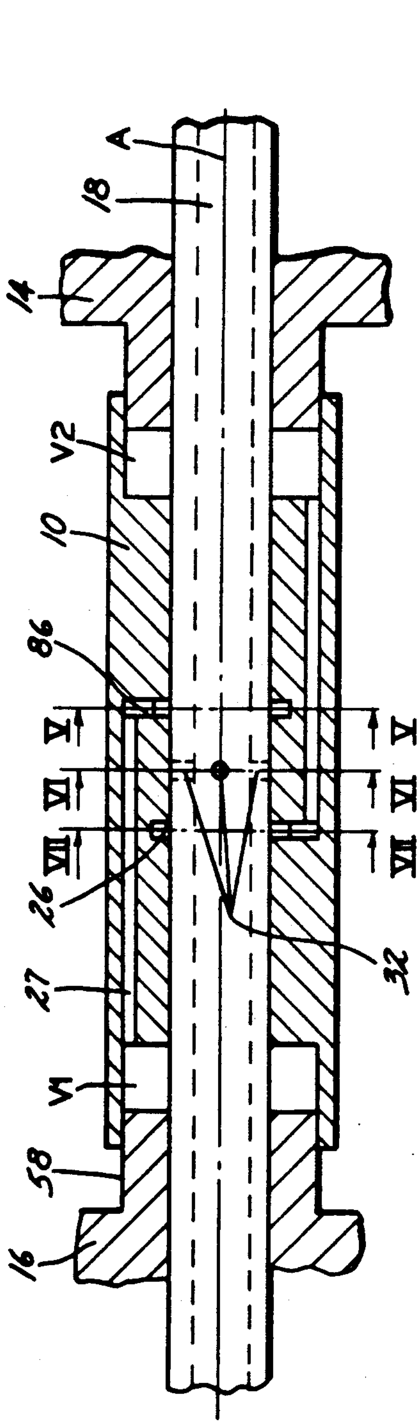
FIG. 4 shows a partial longitudinal section through a linear vibrator having annular grooves arranged on both sides in the region of the longitudinal median plane.
Figure 7:
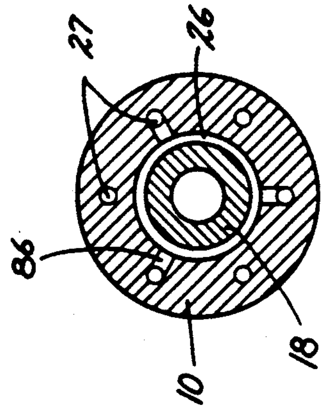
FIG. 7 shows a cross-section along line VII—VII in FIG. 4.
Figure 6:
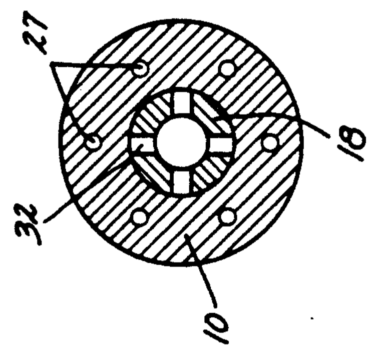
FIG. 6 shows a cross-section along line VI—VI in FIG. 4.
Figure 5:
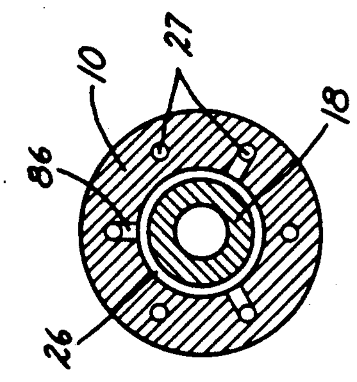
FIG. 5 shows a cross-section along line V—V in FIG. 4.

The most conspicuous difference between the linear vibrator of FIG. 3 and that of FIGS. 1 and 2 is that the end part 16 is designed as a fixing flange having a mounting surface 54 and bolt holes 56. Both end parts 14, 16 have a sealing lip 57 which is annular in cross-section and has a sealing surface 58 on which the lateral inner wall of a pot-shaped recess of the piston 10 slides at the faces.

The end part 14 is provided with an end lid 60 through which exhaust-air bores 62 lead for the compressed-air expelled from the working volumes $V_1$, $V_2$.

The sound-absorbing pipe 52, coaxial with respect to the axis A, is of sealing configuration; it is put onto the two end parts 14, 16 at the faces.

In accordance with FIGS. 1 and 2, the piston has two annular grooves 26 which are arranged adjacent to the faces and are at a distance n. The channels 27 are bores which run in the axial direction and connect an annular groove to the adjacent pot-shaped recess in the face.

The guide pipe 18, provided with an external 64 and an internal thread 66 on both faces, protrudes from the vibrator on both sides and has, at a distance a apart, at least two, preferably three axisymmetric outlet openings 32 each. The piston 10 is thereby guided with an air bearing cushion. The external threads 64 permit mounting on both sides if required.

With the nut 68 and the tapered nut 70 put onto the external thread 64 of the guide pipe 18, the end parts 14, 16 are pressed onto the sound-absorbing pipe 52, and the parts of the vibrator are thus assembled in a mechanically rigid manner. During the supply of air, possible on both sides, through the guide pipe 18, one of the inlet openings is closed by a closure plug 72, and the piston of length 1 starts to vibrate. A coil spring 74 used as a starting aid automatically causes an annular groove 26 of the piston 10 and axisymmetric outlet openings 32 of the guide pipe 18 to lie one over the other in the operative state. The coil spring 74 rests at one end on the end part 16 and at the other end in a groove (not shown for the sake of simplicity) in the outer circumference of the piston 10.

On the exhaust-air side, a closure lid 76 is screwed onto the guide pipe 18. Via an O-ring, the closure lid 76, secured by a locknut 80, presses a porous sound-absorbing element 82, annular in cross-section, into a correspondingly formed groove in the end lid 60. An annular slot 84 remains open between the end lid 60 and the closure lid 76, through which slot 84 the exhaust air can escape after passing through the sound-absorbing element 82. The closure lid 76 is therefore the housing for the sound-absorbing element 82 and at the same time is used for the fine adjustment of the exhaust-air quantity, the slot 84 being closed or open and the inserted O-ring 78 being more or less compressed. The width of the exhaust-air slot 84 has an effect on the noise produced by the vibrator and on its frequency.

If the air is supplied from the exhaust-air side, the guide pipe 18, closed on the other side, can be cut off flush with the mounting surface 54 or slightly sunk and thus attachment to a flat base can be facilitated.

Apart from the starting aid mentioned, the functional principle of FIG. 3 corresponds to that of FIGS. 1 and 2.

The linear vibrator shown in its essential functional parts in FIGS. 4 to 7 has a guide pipe 18 with four axisymmetric outlet openings 32. The piston 10, corresponding in its outer contours to FIG. 3, has two annular grooves 26 arranged adjacent to the longitudinal median plane. These annular grooves 26 are each connected via radial branch channels 86 to channels 27 which run in the axial direction and lead to the more remote face of the piston. Consequently, the outlet openings 32, when they lie over an annular groove 26 and pressure medium is supplied to a working volume $V_1$ or $V_2$, are always displaced back into the region between the two annular grooves 26.

For the sake of simplicity a starting aid is not shown; it can be produced in the manner shown above.

Whether the guide pipe 18 having the end parts 14, 18 or the piston 10 is fixed to the bearing surface can likewise be left open.

Figure 8:
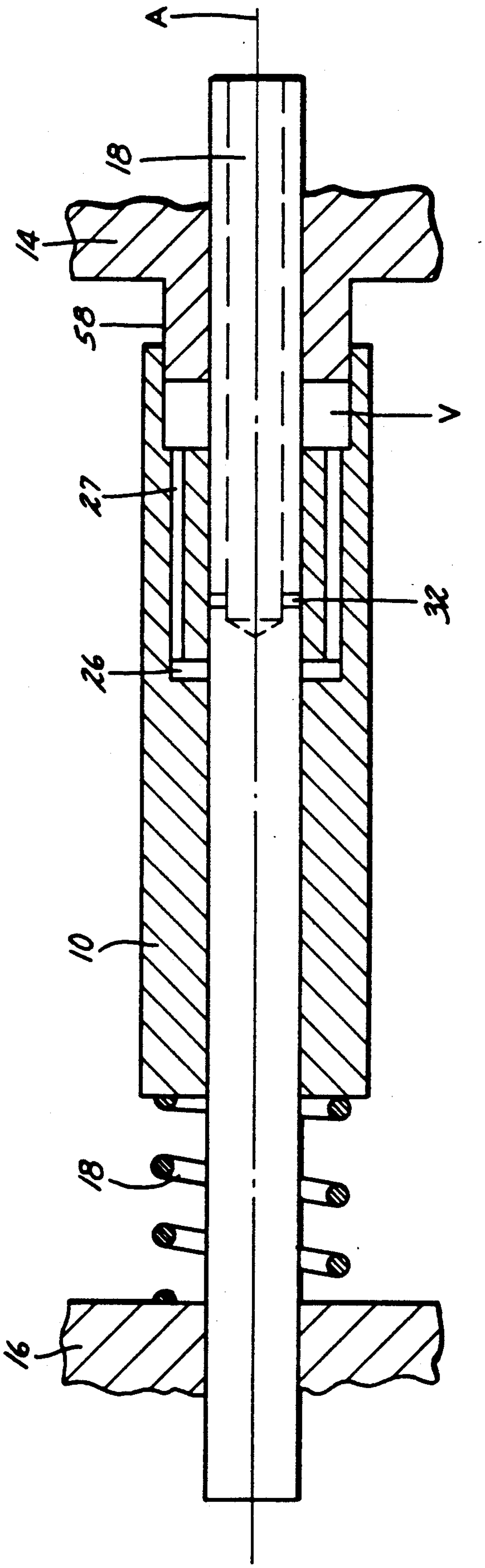
FIG. 8 shows a partial longitudinal section through a linear vibrator having a return spring arranged on one side.

FIG. 8 shows a linear vibrator which works with pneumatic/mechanical acceleration means. The guide pipe 18 is designed to be tubular only on the inlet side of the pressure medium by a cylindrical bar being drilled out. On this side, the piston 10 is designed in accordance with FIG. 3. On the other side, however, a return spring 88 is arranged between the face of the piston 10 and the end part 16.

The return spring is compressed when the outlet openings 32 and the annular groove 26 lie one over the other and the pressure medium flows out into the working volume V via the channels designed as a bore.

As soon as the piston 10 has been displaced under the pressure of the medium so far in the direction of the return spring 88 that the medium can escape from the working volume V, the return spring thrusts the piston 10 back until the medium can again flow out of the outlet openings 32, and a new working cycle starts.

The spring force of the return spring 88 and the pressure of the supplied medium must be matched. If the annular groove 26 and the outlet openings 32 do not lie one above the other in the neutral position, a starting aid of the type mentioned is used.

I claim:

1. In a pneumatic linear vibrator, comprising a piston guide sealed at least on one side and delimited by detachable end parts (14, 16), a piston (10), a pipe (52), and means for supplying and removing a gaseous or vaporized pressure medium, the relative motion between the guide with the end parts and the piston being effected by automatic alternating supply of the pressure medium to a working volume (V, $V_1$, $V_2$) formed on one face of the piston, the piston (10) having a longitudinal axial bore (22) which has annular grooves (26) in the region of at least one of the ends or close to at least one side of the longitudinal half-way point of the piston, wherein the annular grooves (26) are connected to a face of the piston (10) by at least two axisymmetric channels (27) which run in the axial direction (A) and are sealed off from the longitudinal axial bore (22) of the piston (10), said face being the adjacent face when the annular grooves (26) are arranged in the region of the piston ends and the remote face when the annular grooves (26)

are arranged in the region of the longitudinal half-way point of the piston, and a guide pipe (18) for the supply of the pressure medium, wherein the guide pipe (18) is closed on one side, penetrates through the end parts (14, 16) and the longitudinal axial bore (22) of the piston (10) in a sealing manner, serves as a piston guide and has radially disposed axisymmetric outlet openings (32) for the pressure medium which correspond to the annular grooves (26) in the longitudinal axial bore (22) of the piston (10); the improvement which comprises the piston (10) is guided on a cushion of air by the guide pipe (18), the outer pipe (52) is in the form of a sound-absorbing pipe running over its whole length at a distance spaced from the piston (10), an annular clearance (R) is formed between the piston (10) and one end part (14 or 16) at its reverse position for the exhaust of the pressure medium, and the working volume (V, $V_1$, $V_2$) is formed by the pot-shaped end parts (14, 16) for the gas-tight receipt of the ends of the piston (10) or by pot-shaped faces of the piston (10) for the gas-tight receipt of the end parts (14, 16), the flat bottom of the pot and the inserted face being arranged holohedrically parallel to form on at least one side a pressure cushion.

2. The linear vibrator as claimed in claim 1, wherein, when the annular grooves (26) are arranged in the region of the piston ends, at a distance (n) between them which is smaller and a length (l) of the piston which is greater than the distance (a) between the outlet openings (32) in the guide pipe (18), the annular grooves (26), lying inside or on the outlet openings (32).

3. The linear vibrator as claimed in claim 1, wherein, when the annular grooves (26) are arranged on both sides in the region of the longitudinal half-way point of the piston, axisymmetric outlet openings (32) are cut out only at one axial height of the guide pipe (18), the outlet openings (32), in the operative state, lying between or on the annular grooves (26).

4. The linear vibrator as claimed in claim 1, wherein the guide pipe (18) for guiding the piston (10) with an air bearing cushion has at least two axisymmetric outlet openings (32).

5. The linear vibrator as claimed in claim 4, wherein a spring (74) is fitted as a starting aid to one piston end, which said spring (74), in the operative state, causes at least one of said annular grooves (26) and axisymmetric outlet openings (32) in the guide pipe (18) to lie on top of one another.

6. The linear vibrator as claimed in claim 4, wherein a starting aid is formed by the guide pipe (18) having a stepped narrowed section (28) on the outer circumference between the axisymmetric outlet openings (32) for the pressure medium, which stepped narrowed section (28) continues up to the corresponding end part (16), by at least one auxiliary bore (30) penetrating through the narrowed pipe wall directly next to the narrowed section (28), and by the longitudinal axial bore (22) of the piston (10), between the annular grooves (26), having a cross-section reduction (24) which corresponds to the narrowed section (28) of the guide pipe (18) and continues up to the face, the auxiliary bore(s) (30) being open in each position of the piston (10).

7. The linear vibrator as claimed in claim 6, wherein the sliding surfaces are coated with a friction-reducing, wear-resistant inorganic or organic material.

8. The linear vibrator as claimed in claim 7 for use as a plunging vibrator, wherein the sound-absorbing pipe (52) is closed on the faces of the linear vibrator, in which arrangement hoses for the supply of the pressure medium or their connecting pieces penetrate through the surface, and the surface is equipped with a connecting piece for the removal of the pressure medium.

9. The linear vibrator as claimed in claim 8, wherein the sound-absorbing pipe (52) is made of a corrosion-resistant and/or erosion-resistant material or is covered with it.

10. The linear vibrator as claimed in claim 7 for use as a striking tool, wherein at least the face of the end part (16) remote from the compressed-air supply and the corresponding face of the piston (10) are made of a wear-resistant and impact-resistant material, and at least one bore penetrates through the wall of the end part (16) just in front of the striking surface of the piston (10).

* * * * *